United States Patent [19]

Straub

[11] 4,247,015
[45] Jan. 27, 1981

[54] CLOSURE MEANS FOR A LARGE DIAMETER VESSEL

[75] Inventor: Hermann Straub, Winterthur, Switzerland

[73] Assignee: Sulzer Brothers Limited, Winterthur, Switzerland

[21] Appl. No.: 79,065

[22] Filed: Sep. 26, 1979

[30] Foreign Application Priority Data

Oct. 10, 1978 [CH] Switzerland .................. 10502/78

[51] Int. Cl.³ .............................................. B65D 45/00
[52] U.S. Cl. ...................................... 220/328; 220/3; 220/315; 220/327; 292/256.67
[58] Field of Search .................. 220/315 A, 315, 319, 220/325, 327, 328; 292/256.67, 256.71

[56] References Cited

U.S. PATENT DOCUMENTS

| | | | |
|---|---|---|---|
| 3,219,228 | 11/1965 | Sorensen | 220/315 |
| 3,437,230 | 4/1969 | Savory | 220/327 |
| 4,009,798 | 3/1977 | Pechacek | 220/315 X |
| 4,054,224 | 10/1977 | Pechacek | 220/325 X |

*Primary Examiner*—George T. Hall
*Attorney, Agent, or Firm*—Kenyon & Kenyon

[57] ABSTRACT

The vessel cover has an outer section which engages over a coaxial inner section of the bottom part of the vessel. The outer section has radial bores each of which contains a blocking member in the form of a ball while the inner section has recessed abutment surfaces for each ball. A closure ring surrounds the outer section and when in a locked position, the ring presses the balls against the abutment surfaces whereas in a released position, the balls are allowed to move outwards from the abutment surfaces. The inner surface of the ring pressing the balls against the abutment surfaces is formed by the end surfaces of set screws which are threadably inserted in the ring so that pressure can be exactly adjusted for each ball.

6 Claims, 3 Drawing Figures

CLOSURE MEANS FOR A LARGE DIAMETER VESSEL

This invention relates to a closure means for a large vessel. More particularly, this invention relates to a closure means for a large diameter pressure vessel.

As is known, large diameter pressure vessels have usually been sub-divided into a number of separate parts which can be brought together in coaxial relation and secured together to form a closed unit. In some cases, it has been known to connect the cover of such a pressure vessel via a flanged connection to the remainder of the vessel. It has also been known, for example as described in co-pending U.S. patent application Ser. No. 968,867, filed Dec. 12, 1978, to utilize a locking means for securing two coaxial cylindrical sections of a pressure vessel together. In this case, the locking means employs a plurality of locking members which are mounted in one section for movement into and out of a groove in the other section via manipulation of a clamping ring disposed about the sections. However, it has been found that if a closure means of this kind is used on a large diameter vessel wherein the parts to be connected are flexible, a difficult measurement problem results. In such cases, as described in said Patent Application, the closure ring is constructed in a number of parts so that the inner periphery can be adjusted to the actual dimensions of the two cylindrical sections being connected. This, however, has been found to be inadequate in that the bending resistance of the closure ring differs from the average value at the points of separation. Consequently, there are some variations in the force with which the locking members at the points of separation are pressed inwardly.

Accordingly, it is an object of the invention to provide a closure means for a pair of cylindrical sections of a pressure vessel which avoids variations in the force with which the sections are secured together.

It is another object of the invention to provide a closure means for two cylindrical sections of a vessel which imparts a uniform locking force between the two sections.

It is another object of the invention to provide a closure means of relatively small radial dimensions.

Briefly, the invention is directed to a pressure vessel having a pair of overlapping coaxial cylindrical sections wherein an inner one of the sections has a plurality of abutment surfaces and an outer one of the sections has plurality of radial passages respectively aligned with the abutment surfaces. In addition, a plurality of blocking members are disposed in the radial passages for movement against and away from a respective abutment surface.

In accordance with the invention, a closure ring is disposed about the outer section of the vessel. This ring is movable relative to the outer section in order to move between a locking position wherein the blocking members are moved against the abutment surfaces and a release position wherein the blocking members are movable away from the abutment surfaces. The ring also has a plurality of threaded bores aligned respectively with the radial passages and a plurality of set screws are threaded into the respective bores of the ring in order to press a respective blocking member against a respective abutment surface.

The closure means provided by the closure ring and set screws has a relatively small radial dimension.

In addition, guide means are provided for guiding the closure ring coaxially of the outer section of the vessel while preventing relative rotation between the ring and outer section. In this case, the blocking members are tightened by an axial displacement of the closure ring. This provides the advantage that the axes of the set screws are always aligned with the center of the blocking members.

Each threaded bore in the closure ring is disposed in a radial plane relative to the ring and at an inclined angle relative to a plane transverse to the vessel. Also, each set screw has a flat end surface facing a blocking member. This insures that the Hertzian pressure on the end surface of the blocking member is more favorable than if the threaded set screws are disposed in a common plane and terminate in a flat cone or a slight convexity.

The closure means may also have a plurality of hollow counter-screws each of which is threaded in a respective bore of the ring to secure a set screw in place. By preventing the set screws from rotating, a very simple fool-proof construction is provided.

These and other objects and advantages of the invention will become more apparent from the following detailed description and appended claims taken in conjunction with the accompanying drawings in which:

Figure 1:
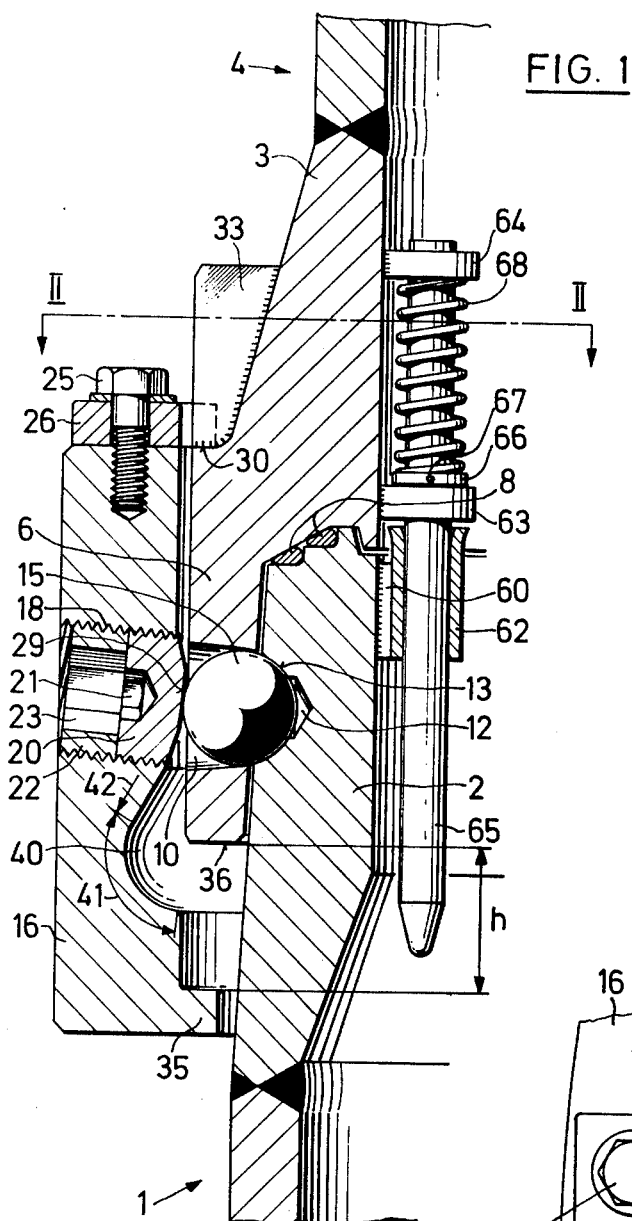
FIG. 1 illustrates an axial sectional view through a closure means according to the invention on a large pressure vessel.

Referring to FIG. 1, a large diameter pressure vessel 1 is constructed with a pair of overlapping coaxial cylindrical sections 2, 3. As shown, the inner section 2 is welded to the bottom part of the vessel 1 while the outer section 3 forms part of a cover 4 of the vessel 1. In addition, the outer section 3 has a tubular portion 6 which overlaps the inner section 2. A pair of seals 8 are disposed in suitable stepped recesses on the end surface of the inner section 2 and abuts a conical counter surface on the outer section 3.

The inner section 2 is provided with a plurality of abutment surfaces each of which is formed by a blind bore 12 having a spherical recess 13. These abutment surfaces are spaced circumferentially about the outer surface of the section 2. In addition, the outer section 3 has a plurality of radial passages 10, for example 180 in number. The passages 10 are each in the form of conical bores and are disposed around the periphery of the pressure vessel in the tubular portion 6. In addition, each bore 10 is aligned with a respective bore 12 in the inner section 2.

A plurality of blocking members 15, for example in the form of balls, are disposed in the respective passages 10 for abutting a respective abutment surface (spherical recess 13).

As shown, a closure ring 16 is disposed about the tubular portion 6 of the outer section 3. This ring 16 is movable coaxially of the sections 2, 3 and has a plurality of threaded bores 18 aligned with the respective radial passages 10. The threaded bores 18 are disposed in radial planes relative to the ring 16 and at an inclined angle relative to a horizontal plane, as viewed, transverse to the axis of the vessel 1. The axis of each bore 10 extends approximately through the center of an associated ball 15.

The ring 16 is provided with a plurality of short set screws 20 each of which is threaded into a respective bore 18 to press a respective ball 15 against a respective abutment surface 13. Each set screw 20 has an internal hexagonal recess 21 on the side opposite the ball 15. In addition, a plurality of hollow counter screws, each in the form of a threaded ring 22 having an inner hexagonal bore 23, are threaded into the respective bores 18. Each counter screw 22 is firmly clamped in a suitable position relative to the set screw 20 so that the ball 15 is pressed at a predetermined pressure into the abutment surface 13. As shown, the end surface 29 of each set screw 20 facing a ball 15 has a flat central region which merges into an outer conical surface.

In addition a guide means is provided for guiding the ring 16 coaxially of the outer section 3 while preventing rotation therebetween. To this end, the guide means includes a plurality of abutment members 26 which are secured in peripherally spaced relation about the ring 16 by pairs of screws 25. As shown, the abutment members 26 project inwardly beyond the closure ring 16 to lie against a shoulder 30 on the outer section 3. In addition, the guide means includes vertical ribs 33 which are formed on the outer section 3 and which are received within a vertical rectangular slot 31 in each abutment member 26.

The closure ring 16 also has an inwardly directed collar 35 spaced below and in the plane of the outer section 3 in facing relation to a lower end surface 36 of the outer section 3. With the closure ring 16 in the position illustrated in FIG. 1, a space h exists between the collar 35 and the lower end surface 36 of the section 3. Thus, the ring 16 can be raised relative to the section 3 over the height h.

The closure ring 16 also has an inner surface which is profiled to move the blocking members 15 against the abutment surfaces 13 upon movement of the ring 16 in a downward direction, as viewed, and to allow the blocking members 15 to move away from the abutment surfaces 13 upon movement of the ring 16 upwardly, as viewed. When in the lower position, the ring 16 is in a locking position with the blocking members 15 moved against the abutment surfaces 13. In the uppermost position, the closure ring 16 is in a released position wherein the blocking members 15 are movable away from the abutment surfaces 13. The profiled inner surface of the ring 16 provides a groove 40 so that the locking members 15 may roll into the groove 40 when the ring is in the released position. This groove 40 has a toroidal lower portion 41 and a conical upper portion 42 which terminates at the end surface of the set screws 20. The depth of the groove 40 is such that the locking members 15, rolling outwardly along the bores 10, completely unblock the outer diameter of the inner section 2 in the neighborhood of the abutment surfaces 13.

Consequently, by axial displacement of the ring 16 the blocking members, i.e. balls, 15 can be brought into engagement with the associated abutment surfaces 13 or released therefrom.

When the cover 4 is placed on the bottom part of the vessel 1, it is important for the axes of the blind bores 12 to coincide with the axes of the bores 10. This is insured by the use of means for aligning the sections 2, 3 coaxially of each other. This alignment means includes at least two bushes 62 mounted on the inside of the inner section 2 in spaced apart relation about the inner periphery of the section 2. As shown, each bush 62 is welded to the section 2 via a web 60. In addition, a setting plug 65 having a conical lower end is disposed in line with each bush 62 and is mounted on the outer section 3. To this end, the inner surface of the section 3 carries pairs of spaced apart lugs 63, 64 in which the plug 65 is slidably mounted. In addition, each plug 65 has a ring 66 secured thereon by a pin 67 while a spring 68 is disposed between the lug 64 and the ring 66.

In order to release the cover 4 from the illustrated locked position, the closure ring 16 is raised coaxially of the axis of the vessel 1 via the use of a suitable lifting tool (not shown). When the ring 16 is raised, the balls 15 roll outwardly along the flat surface and adjacent conical surface of the end 29 of each set screw 20. Thereafter, the balls 15 roll along the conical surface 42 of the groove 40 in the closure ring 16. After being raised over the height h the collar 35 of the ring 16 abuts the end surface 36 of the outer section 3. At this time, the balls 15 are in the neighborhood of the toroidal surface 41 of the groove 40. When the ring 16 is further raised, any balls still abutting the abutment surfaces 13 are subjected to radial forces and thus are released and roll outwards. The closure means is thus fully open and, when the ring 16 is further raised, the cover 4 is lifted from the bottom part of the vessel 1.

The cover 4 can now be placed on a flat support. In this case, the setting plug 65 are pushed upwards into the lugs 63, 64 against the action of the spring 68 and are thus not exposed to damage.

In order to replace the cover 4, the cover is raised on the ring 16. At this time, the setting plugs 65 automatically move into their extended position. Thus, when the cover 4 is lowered onto the bottom part of the vessel 1, the insertion of the plugs 65 into the bushes 62 can easily be checked by viewing from a substantially horizontal direction. The amount by which the plugs 65 may be moved is made small enough to insure that the plugs 65 penetrate into the bushes 62 and center the downwardly moving cover 4 before the cover bears on the bottom part of the vessel 1.

The adjustment of the set screws takes place as follows: First of all, the cover 4, ring 16, and balls 15 are placed on the bottom part of the vessel 1 while the set screws 20 are loose. Next, the ring 16 is raised and placed on shims (not shown) having a uniform, predetermined thickness and inserted between the abutment members 26 and the shoulders 30 on each side of the guide ribs 33. At the same time, the ring 16 is centered relative to the outer section 3 by shims (not shown) inserted into the radial gap between the tubular portions 6 and the ring 16. Next, the set screws 20 are rotated by Allan keys (not shown) until the screws 20 abut the associated balls 15. Since the thread of the bores 18 works easily, the moments when the set screws 20 abut the balls 15 or the balls abut the associated abutment surfaces 13 can be detected because of the increase in the resistance of the set screws 22 rotation. Next, by means of a hollow hexagonal socket wrench (not shown) the threaded rings 22 are threaded until abutting the set screws 20 which are held by an Allan Key (not shown). Thereafter, the set screw 20 and threaded ring 22 are simultaneously clamped together. Preferably this adjustment of the screws 20 is made simultaneously at pairs of opposite places on the ring periphery, for example at the 0° and 180° positions, then at the 90° and 270° positions then at the 46° and 225° positions and so on.

When the ring 16 is raised and again lowered, after removal of the above mentioned shims, the balls 15 are uniformly pressed into the associated abutment surfaces 13. This exerts tangential pressure on the inner section 2 and tangential tension on the ring 16.

Advantageously, the seals 8 are not mounted in place before the screws 20 are adjusted.

Figure 3:
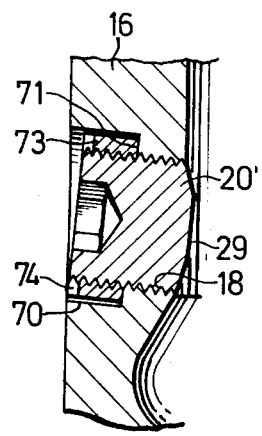
FIG. 3 illustrates a sectional view similar to FIG. 1 of a modified set screw according to the invention.
Figure 2:
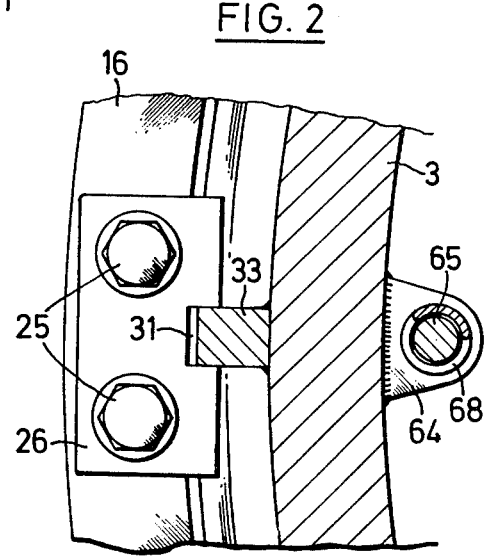
FIG. 2 illustrates a sectional view taken on line II—II of FIG. 1.

Referring to FIG. 3, each threaded bore 18 may be alternatively shaped with an external cylindrical bore 70 and a shoulder 71. In similar manner, each set screw 20' is then provided with a securing nut 73 on the portion projecting into the bore 70. Also, radial slots 74 are formed in the nut 73 so that the nut 73 can be tightened by means of a tightening key (not shown). Such set screws 20' have an advantage over the set screws 20 of FIG. 1 in that when the nut 73 is tightened, the set screw 20' abuts the side of the thread the nut and thus bears more efficiently. These set screws 20' are adjusted in the same manner as the set screws 20 described in the embodiment of FIG. 1.

Advantageously, the inner diameter of the threaded bores 18 (FIG. 3) are made sufficiently large for the balls 15 to be taken out through the associated threaded bore if necessary.

The closure means provided by the invention is particularly advantageous for conveyance in a deformed state from a factory to an assembly site, for example as described in the above mentioned co-pending application.

What is claimed is:

1. In combination with a large diameter vessel having a pair of overlapping coaxial cylindrical sections wherein an inner one of said sections has a plurality of abutment surfaces spaced circumferentially about an outer surface thereof and the outer one of said sections has a plurality of radial passages, each said passage being aligned with a respective abutment surface, and a plurality of blocking members, each said member being disposed in a respective radial passage for abutting a respective abutment surface;

a ring disposed about said outer section, said ring being movable coaxially of said outer section and having an inner surface profiled to move said blocking members against said abutment surfaces upon movement of said ring in one direction and to allow said blocking members to move away from said abutment surfaces upon movement of said ring in an appropriate direction, said ring having a plurality of threaded bores aligned respectively with said radial passages; and a plurality of set screws, each said screw being threaded into a respective bore of said ring to press a respective blocking member against a respective abutment surface.

2. The combination as set forth in claim 1 which further comprises guide means for guiding said ring coaxially of said outer section while preventing relative rotation therebetween.

3. The combination as set forth in claim 2 wherein each threaded bore is disposed in a radial plane relative to said ring and at an inclined angle relative to a plane transverse to said vessel, and wherein each screw has a flat end surface facing a blocking member.

4. The combination as set forth in claim 1 which further comprises a plurality of hollow counter-screws, each said counter-screw being threaded in a respective bore to secure a set screw in place.

5. In combination
   a pressure vessel having a pair of overlapping coaxial cylindrical sections, an inner one of said sections having a plurality of abutment surfaces thereon and an outer one of said sections having a plurality of radial passages respectively aligned with said abutment surfaces;

a plurality of blocking members, each said member being disposed in a respective radial passage for movement against and away from a respective abutment surface;

a closure ring about said outer section, said ring being movable relative to said outer section to move between a locking position wherein said blocking members are moved against said abutment surfaces and a released position wherein said blocking members are moveable away from said abutment surfaces, said ring having a plurality of threaded bores aligned respectively with said radial passages; and a plurality of set screws, each said screw being threaded into a respective bore of said ring to press a respective blocking member against a respective abutment surface in said locking position.

6. The combination as set forth in claim 5 which further includes means for aligning said sections coaxially of each other.

* * * * *

UNITED STATES PATENT AND TRADEMARK OFFICE
CERTIFICATE OF CORRECTION

PATENT NO. : 4,247,015
DATED : January 27, 1981
INVENTOR(S) : H. Straub

It is certified that error appears in the above—identified patent and that said Letters Patent is hereby corrected as shown below:

Column 5, line 14, after "the thread" insert --near--

Signed and Sealed this

Nineteenth Day of May 1981

[SEAL]

Attest:

RENE D. TEGTMEYER

Attesting Officer     Acting Commissioner of Patents and Trademarks